United States Patent
Gallella (10) Patent No.: US 7,143,365 B2
(45) Date of Patent: Nov. 28, 2006

(54) METHOD AND APPARATUS FOR USING A BROWSER TO CONFIGURE A SOFTWARE PROGRAM

(75) Inventor: Ron M. Gallella, Beaverton, OR (US)

(73) Assignee: WebTrends, Inc., Portland, OR (US)

( * ) Notice: Subject to any disclaimer, the term of this patent is extended or adjusted under 35 U.S.C. 154(b) by 672 days.

(21) Appl. No.: 10/175,327

(22) Filed: Jun. 18, 2002

(65) Prior Publication Data
US 2003/0231203 A1 Dec. 18, 2003

(51) Int. Cl.
G06F 15/00 (2006.01)
G06F 13/00 (2006.01)

(52) U.S. Cl. ............... 715/851; 715/853; 715/736; 709/223

(58) Field of Classification Search ........ 715/765, 715/853, 854, 851, 736, 764, 763; 709/223, 709/209, 203, 219
See application file for complete search history.

(56) References Cited

U.S. PATENT DOCUMENTS 5,933,140 A 8/1999 Strahorn et al.
6,112,238 A 8/2000 Boyd et al.
6,546,397 B1 * 4/2003 Rempell .................. 707/102
6,804,701 B1 * 10/2004 Muret et al. ............. 709/203

FOREIGN PATENT DOCUMENTS

WO 00/45264 8/2000
WO 02/17292 A1 2/2002

* cited by examiner

Primary Examiner—Cao (Kevin) Nguyen
(74) Attorney, Agent, or Firm—Marger Johnson & McCollom, P.C.

(57) ABSTRACT

A method for configuring a web site tracking program on a computer coupled over a network to a web server whereby the web page or object to be tracked is displayed on a display device within a browser window in synchronicity with the web site tracking criteria selected for that page or object. The web browser is operated on the computer with a configuration program to retrieve a web page or object from the web site server and display it in a browser window and the tracking criteria within a configuration pane or subwindow. The operator selects within the configuration pane or subwindow the web tracking criterion to be configured and the proper URL, FTP or other identifying link to the criteria is automatically generated for and associated with the web page or object displayed.

18 Claims, 6 Drawing Sheets

METHOD AND APPARATUS FOR USING A BROWSER TO CONFIGURE A SOFTWARE PROGRAM

BACKGROUND OF THE INVENTION

The present application relates to compiling and reporting data associated with activity on a network server and more particularly to a method and apparatus for configuring web site traffic analysis programs by, for instance, enhancing categorization of web pages into traffic reporting groups.

Programs for analyzing traffic on a network server, such as a worldwide web server, are known in the art. One such prior art program is described in U.S. patent application Ser. No. 09/240,208, filed Jan. 29, 1999, for a Method and Apparatus for Evaluating Visitors to a Web Server, which is incorporated herein by reference for all purposes. NetIQ Corporation owns this application and also owns the present application. In these prior art systems, the program typically runs on the web server that is being monitored. Data is compiled, and reports are generated on demand—or are delivered from time to time via email—to display information about web server activity, such as the most popular page by number of visits, peak hours of website activity, most popular entry page, etc.

Analyzing activity on a worldwide web server from a different location on a global computer network ("Internet") is also known in the art. In a conventional implementation, a provider of remote web-site activity analysis ("service provider") generates JavaScript code that is distributed to each subscriber to the service. The subscriber copies the code into each web-site page that is to be monitored. When a visitor to the subscriber's web site loads one of the web-site pages into his or her computer, the JavaScript code collects information, including time of day, visitor domain, page visited, etc. The code then calls a server operated by the service provider-also located on the Internet-and transmits the collected information thereto as a URL parameter value. Information is also transmitted in a known manner via a cookie. Each subscriber has a password to access a page on the service provider's server. This page includes a set of tables that summarize, in real time, activity on the customer's web site.

The basic mechanism of such services is that each tracked web-site page contains some JavaScript in it that requests a 1×1 image from the service provider's server. Other information is sent along with that request, including a cookie that uniquely identifies the visitor. Upon receipt of the request, applicants' service records the hit and stages it for full accounting. This is a proven method for tracking web site usage.

The above-described arrangement for monitoring web server activity by operating a program on the web server itself, or by a service provider over the Internet, is generally known in the art. Examples of the information analyzed includes technical data, such as most popular pages, referring URLs, total number of visitors, browser application used, IP addresses of visitors, time and dated web pages visited, returning visitors, etc.

Many, if not most, companies and organizations maintain sites on the worldwide web for informational and commerce purposes. Each site is comprised of multiple pages with varying functions and content.

The operator of each site is interested in knowing how the people who visit it are using the site. Who is coming, where did they come from, what are they looking at, how long did they stay—all are questions that the operator might ask. This curiosity begot the class of tools known as web server log analyzers described above.

Conventional versions of these analyzers report only on the raw data, giving the number of times each particular URL was downloaded. As web sites become more sophisticated, so does the need for more sophisticated analysis. In particular, it becomes important to interpret the meaning of the downloaded pages and report on it, rather than merely the name of the page.

For instance, there might be a hundred pages all with different URLs, and all of the pages pertain to the customer service function. It may be desirable to report the traffic patterns to the Customer Service area of the site, rather than to each of the constituent pages. Given the information that visitors are spending more time in Customer Service than in the Catalog area of the site could help an organization redesign their site.

Other kinds of page classifications are possible: which pages constitute the "shopping cart" of a site, which pages should be filtered out as "noise" in the analysis, which pages indicate a particular advertising campaign that brought visitors to the site, etc.

Known systems for implementing data traffic analysis for hosted web pages, particularly that sold by assignee of the present invention under their Log Analyzer software product, allows a user to configure the program to recognize particular pages or groups of pages as having "special meaning." One example of this would be to categorize a page as "representing a view of a shoe product" or "this set of pages are in our Tech Support area." The method typically used by conventional web data analysis systems for categorizing pages is based on textual pattern recognition of the URL. For example, "all URLs containing the substring 'service' should be grouped into the Customer Service category." As users' needs grow in complexity, so does the means of recognizing URLs.

This complexity has naturally led to the use of regular expressions, which are, in effect, tiny algorithms for pattern matching. The way the user configures these product and content group patterns in applicant's Log Analyzer product is to type in a string to match against every Uniform Resource Locator (URL) that is seen in the log file. For example, one might say, "any URL that matches the expression '/catalog/shoes/*.htm' is a shoe product." In another example, a regular expression for the above condition for URLs in the Customer Service category would be ".*service.*\.html." A URL is only one type of request tracked and others can be contemplated such as requests for video files, PDF files, applications such as Flash-based presentations, etc.

Creating the regular expression by pattern matching requires a lot of knowledge about which specific URLs are contained in the website. The method of matching URLs against a set of defined patterns yields the desired analytic results. However, the accuracy of those results depends on the correctness of the configured patterns. Though this process might be reasonable for the IT engineer or web master, it is cryptic and most likely beyond the capabilities of the manager or marketing person. Unfortunately, since the patterns can be cryptic and complicated, correct configuration can be difficult. The necessity for correct configuration, and its inherent complexity, suggests that a simpler method for specifying and verifying configurations would be welcome.

Accordingly, the need still remains for a way to more easily configure web site traffic tracking programs that overcome the complications of methods taught in the prior art.

SUMMARY OF THE INVENTION

The invention contemplates a novel method for configuring a web site traffic tracking program. According to a preferred embodiment of the invention, the method includes operating a computer web browser software program and a configuration program to browse over a network to a first web page to be tracked. The first web page to be tracked is stored on a web server and has an associated first web page URL. A display device, coupled to the computer, displays a browser window thereon responsive to instructions from the web browser software program. The browser window, in a preferred implementation of the invention, is divided into a web page preview pane, in which the web page to be tracked is displayed, and a configuration pane displaying the web site traffic tracking criteria for the web page displayed preview pane. Examples of web page tracking criteria include path analysis, grouping of web site pages and other material into content groups, filters, scenario analysis, campaigns, URL parameter analysis, products, carts, advertising, and eCommerce setting configurations.

According to an alternate embodiment of the invention, the web site traffic tracking criteria is displayed in a separate window with data linked to the web page currently displayed in the preview window.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

APPENDIX includes source code for a portion of the configuration program adapted to retrieve the URL for the web page to be configured directly from the browser program.

DETAILED DESCRIPTION

Figure 1:
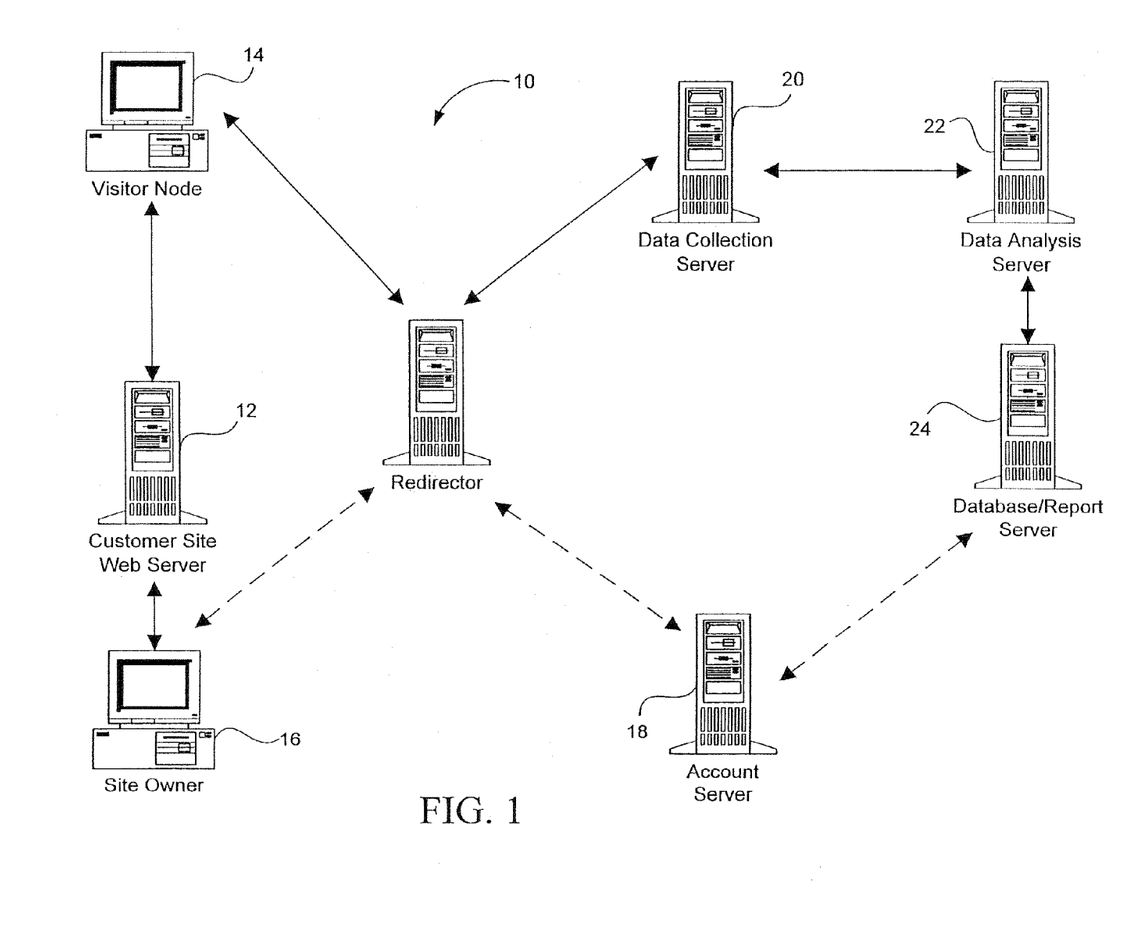
FIG. 1 is a schematic view of a portion of the Internet on which the invention is operated.

Turning now to FIG. 1, indicated generally at 10 is a highly schematic view of a portion of the Internet or other network operative to implement the invention. Included thereon is a worldwide web server 12. Server 12, in the present example, is operated by a business that sells products via server 12, although the same implementation can be made for sales of services via the server. The server includes a plurality of web objects such as web pages that describe the business and the products that are offered for sale that a site visitor can download to his or her computer, like computer 14, using a conventional browser program running on the computer. Web objects that can be downloaded are not intended to be limited herein to web pages, but can also include video files, applications such as .pdf files, and others that are well known in the art. Each web object has an associated web object link used to identify where on the network the web object is stored and thus can be retrieved from. A common example of a web object link for a web page is the Uniform Resource Locator (URL), which uses a Hypertext Transport Protocol (HTTP) to access information over the World Wide Web. HTTP supports access not only to documents written in HTML, but also to files retrievable through FTP or Gopher, as well as to information posted in newsgroups.

As mentioned above, it would be advantageous to the seller to have an understanding about how customers and potential customers use server 12. As also mentioned above, it is known to obtain this understanding by analyzing web-server log files at the server that supports the selling web site. It is also known in the art to collect data over the Internet and generate activity reports at a remote server.

When the owner of server 12 first decides to utilize a remote service provider to generate such reports, he or she uses a computer 16, which is equipped with a web browser program 26, to visit a web server 18 operated by the service provider. On server 18, the subscriber opens an account and creates a format for real-time reporting of activity on server 12.

To generate such reporting, server 18 provides computer 16 with a small piece of code, typically JavaScript code (data mining code). The subscriber simply copies and pastes this code onto each web page maintained on server 12 for which monitoring is desired. When a visitor from computer 14 (visitor node) loads one of the web pages having the embedded code therein, the code passes predetermined information from computer 14 to a server 20—also operated by the service provider—via the Internet. This information includes, e.g., the page viewed, the time of the view, the length of stay on the page, the visitor's identification, etc. Server 20 in turn transmits this information to an analysis server 22, which is also maintained by the service provider. This server analyzes the raw data collected on server 20 and passes it to a database server 24 that the service provider also operates. Another method for tracking visitors to a web site is through the use of objects called cookies whose operation is well known and hence not described in further detail.

When the subscriber would like to see and print real-time statistics, the subscriber uses computer 16 to access server 18, which in turn is connected to database server 24 at the service provider's location. The owner can then see and print reports, like those available through the webtrendslive.com reporting service operated by the assignee of this application, that provide real-time information about the activity at server 12.

The data mining code embedded within the web page script operates to gather data about the visitor's computer. Also included within the web page script is a request for a 1×1 pixel image whose source is server 20. The 1×1 pixel image is too small to be viewed on the visitor's computer screen and is simply a method for sending information to server 20, which logs for processing by server 22, all web traffic information.

The data mined from the visitor computer by the data mining code is attached as a code string to the end of the image request sent to the server 20. By setting the source of the image to a variable built by the script (e.g. www.webtrendslive.com/button3.asp? id39786c45629t120145), all the gathered information can be passed to the web server doing the logging. In this case, for instance, the variable script "id39786c45629t120145" is sent to the webtrendslive.com web site and is interpreted by a decoder program built into the data analysis server to mean that a user with ID#39786, loaded customer web site #45629 in 4.5 seconds and spent 1:20 minutes there before moving to another web site.

The customer web site stored on server 12 contains web objects such as web pages. The traffic from visitor nodes, such as node 14, to the customer web site comprise traffic to that site. As the customer wishes to understand which web pages or other objects are being accessed and with what frequency, it is desired to organize the traffic information into reports. The customer may see patterns from those web site traffic reports and adjust its web site or inventory accordingly.

This invention allows the user to specify and verify the configuration of URL pattern matching directly within the context of the URL in question. Specifically, the user (e.g., service customer) employs an industry standard browser—in this case, Microsoft's Internet Explorer—to browse the site of interest. The invention can be implemented as a plug-in to this browser that, in a preferred embodiment of the invention, appends a configuration pane to the screen that is being displayed. The user can then create or edit patterns to match and can immediately and visually verify that the currently viewed page does or does not match the patterns that have been defined.

Figure 2:
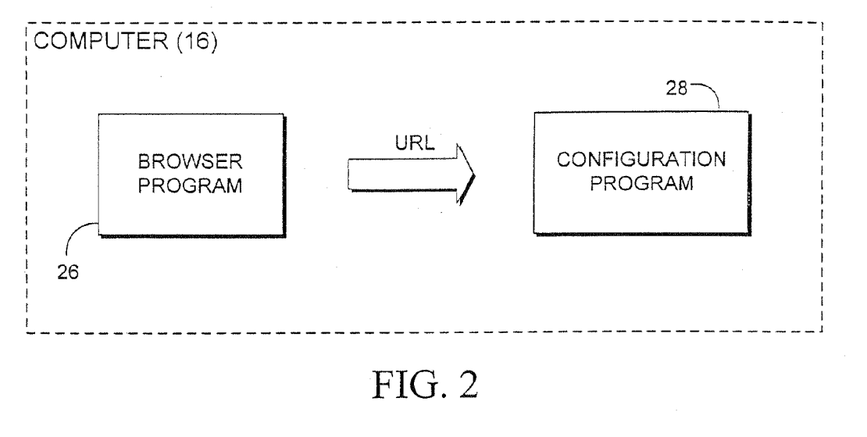
FIG. 2 is a block diagram illustrating an interaction between the browser software program and the configuration program according to a preferred implementation of the invention.

Turning to FIG. 2, the site owner's computer 16 has stored on it for operation a web browser software program 26 and a configuration program 28. The site owner operates the browser program to browse from computer 16 over network 10 to a first web object to be tracked such as a particular web page on his or her web site stored at web server 12. The web object has an associated web object link, such as a URL, with which the browser is able to retrieve the proper object. It is understood that the invention is not limited to browsing over the Internet or even a network at all since the web object could be stored on the computer 16 itself.

Figure 3:
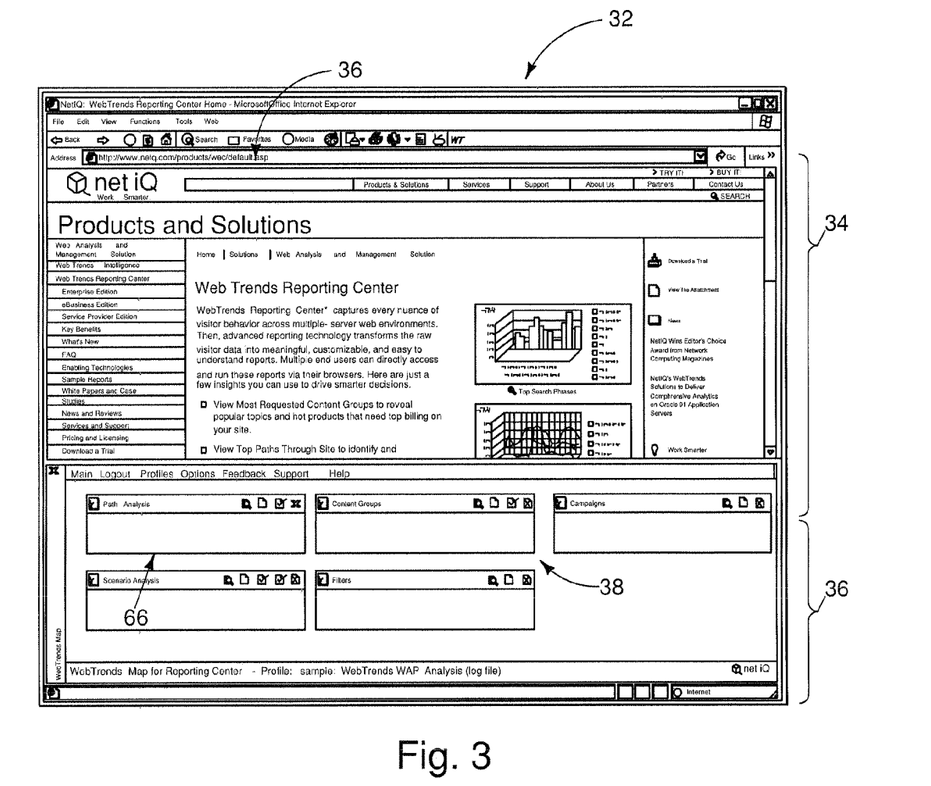
FIG. 3 is an illustration of a screen shot window showing the graphic interface used to configure a software program according to a preferred embodiment of the invention.
Figure 9:
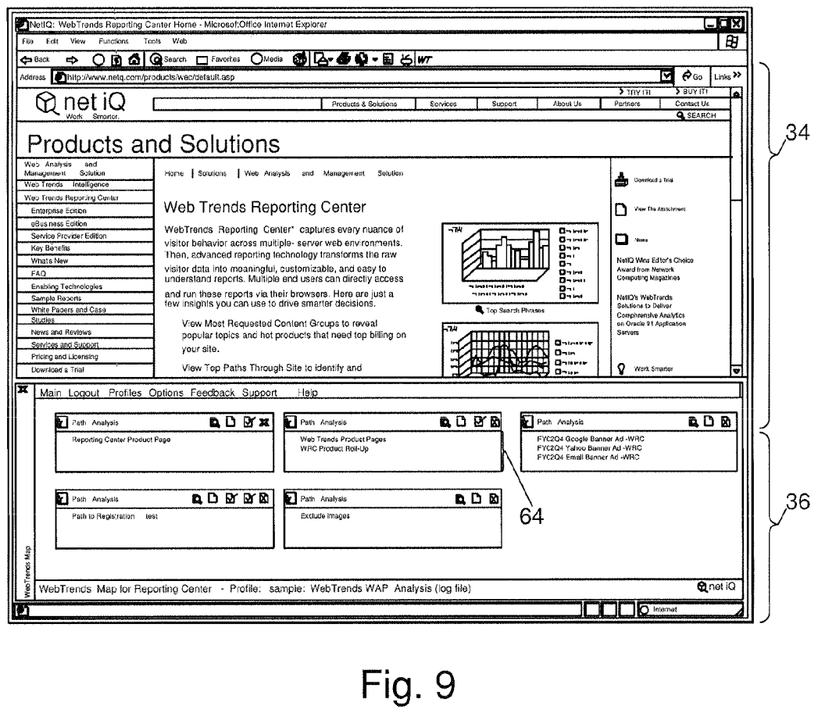
FIG. 9 is an illustration of a screen shot window of FIG. 3 showing the configured web tracking criteria in connection with the web page displayed within the same window per the preferred embodiment of the invention.

FIG. 3 shows a preferred interface implementation of the invention where the web object retrieved from web server 12 is displayed on a display device (such as computer screen 30 in FIG. 5) coupled to computer 16 a web page browser window 32 associated with the web browser software program 28. The web page browser window 32 is divided into a web page preview pane 34 and a configuration pane 36. The first web object to be tracked, here a web page having the URL "http://www.netiq.com/products/wrc/default.asp" as listed within web object link address window 36, is displayed within the web page preview pane 34. The bottom pane 36 of the browser window 32 contains a dashboard displaying the configuration for five types of URL categorization: Path Analysis, Content Groups, Campaigns, Scenario Analysis, and Filters. Other types of criteria can be contemplated such as URL parameter analysis, products, carts, advertising, eCommerce settings, etc. In each category type, it shows the categories whose patterns are matched by the URL in the top pane. The dashboard in FIG. 2 is shown blank in that the customer has not yet used the configuration program to configure the web page for tracking by category as described below. Responsive to the configuration program, however, the web object tracking criteria for the first web object displayed in preview pane 34 is listed with the configuration pane 36 as shown fully configured in FIG. 9.

Once the first web object is configured, the site operator can then browse over the network 10 to a second web object (e.g. different web page) to be tracked. As before, the second web object is displayed within the web page preview pane 34 in place of the first web object. Web object tracking criteria, such as that classified within the five types of URL categorization shown in FIG. 2, for the second object now displayed is listed within the configuration pane 34. The URL is automatically associated with the first web object displayed within the browser window with the configured tracking criteria. An example of code operative on computer 16 to pull URL information from the browser program 26 and automatically associate it with the configuration program 28 is shown in APPENDIX. The associated URL is then processed to allow matching of the URL to the setting. The process may simply use thr full URL, a portion of the URL or generate a regular expression based on the URL.

The user of the invention selects the web-tracking criterion to be configured from those shown in the configuration pane 34. The web-tracking criterion selected is configured as described further below and the newly configured criterion then displayed within the browser window 32 simultaneous with the web object with which the criterion is associated.

Figure 4:
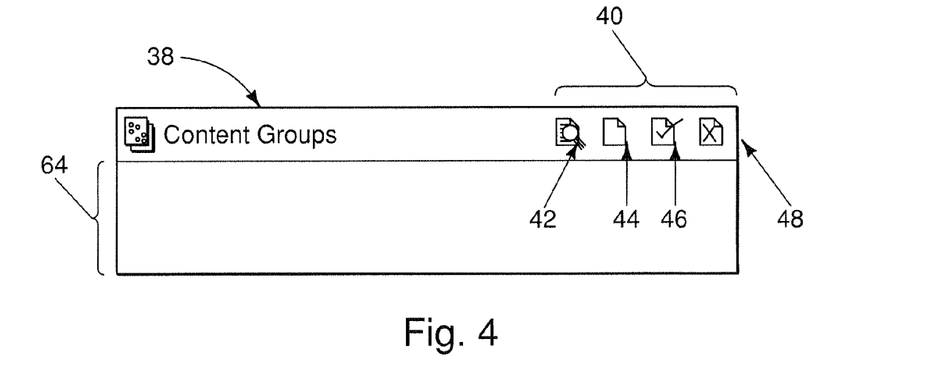
FIG. 4 is an illustration of a portion of the screen shot window of FIG. 3 showing Content Groups as an exemplary web tracking criteria.

A portion of the configuration pane 36 illustrating the exemplary tracking criterion "Content Groups" is shown in FIG. 4. The Content Groups tracking criterion is intended to allow a web site operator to group various web objects into groups so that, for instance, the operator can see within the traffic report how many people chose to visit any one of the many customer service sites found on the customer's web site, or how many visitors chose to download a streaming video image, or listen to an MP3 file from the site. The content groups subwindow is shown as element 38 in FIG. 4 and includes a plurality of function icons 40. The function icons shown include a expand icon 42, a new content group icon 44, an add content group icon 46, and a delete settings icon 48.

Figure 7:
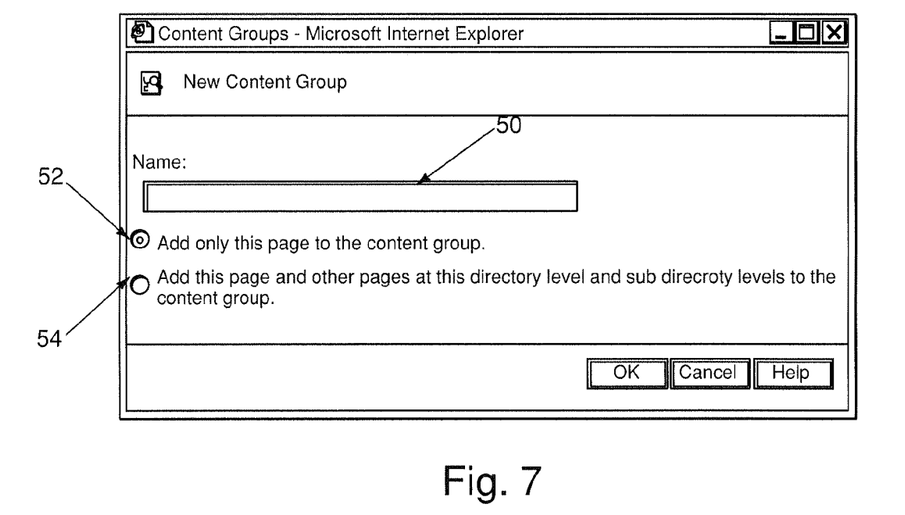
FIG. 7 is an illustration of a screen shot window that enables selection of user-configurable criteria for the New Content Group web tracking criteria.

Clicking on any of these icons causes the configuration program 28 to operate on computer 16 to implement a particular function. For instance, clicking on new content group icon 44 causes the configuration program to bring up the window shown in FIG. 7. The window in FIG. 7 includes a space 50 into which a content group name (e.g. "Products") can be entered. Other click buttons within the New Content Group pop-up window relate to user-selected criteria as to whether only the first web object displayed within browser window 32 is to be added to the content group specified in space 50 (button 52), or whether that page and all others within the directory level and sub directory level to the content group (button 54).

Figure 8:
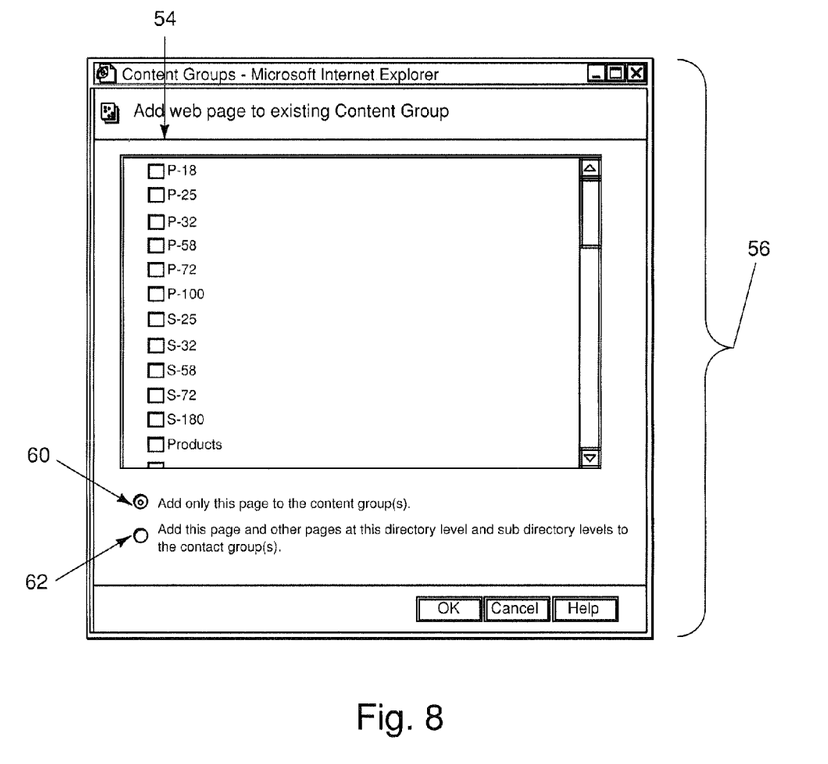
FIG. 8 is an illustration of a screen shot window that enables selection of additional user-configurable criteria for the New Content Group web tracking criteria.

Clicking on add content group icon 46 (FIG. 4) causes the configuration program to operate on computer 16 to display a global list of existing content groups as shown in FIG. 8.

The user can then scroll within subwindow 56 and check those checkboxes 58 for content tracking groups (e.g. "S-100") that the web site operator wants the first web object to be associated with. Again, the operator has the option of adding the content groups to only the web object displayed within browser window 32 (button 60), or to all objects having the same directory and subdirectory levels (button 62). Upon selection of the global or new content tracking groups to be associated with the web object, the selected content groups are added to subwindow 64 (FIG. 4) and displayed simultaneous with the web object to which the group is associated, as for instance in FIG. 9.

Figure 6:
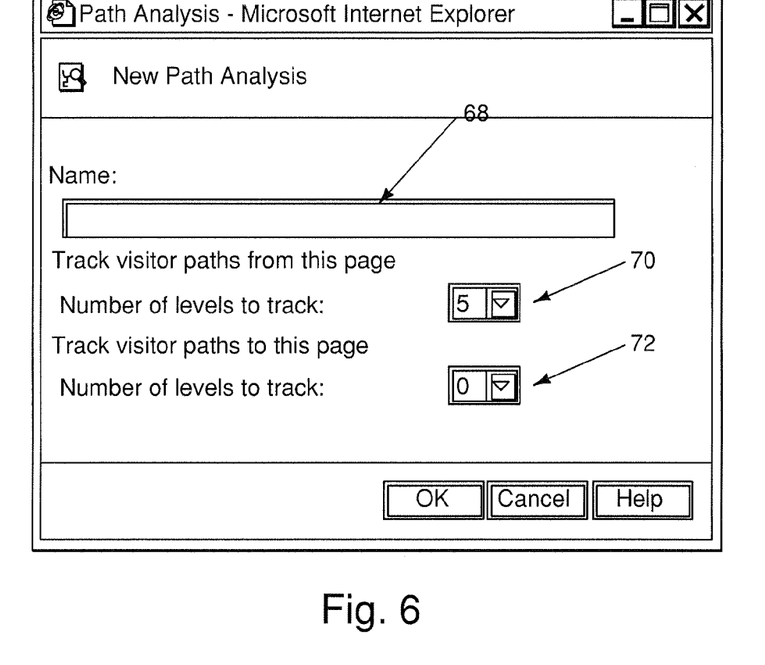
FIG. 6 is an illustration of a screen shot window that enables selection of user-configurable criteria for the New Path Analysis web tracking criteria.

Another exemplary tracking criterion for the web object is Path Analysis, whose subwindow 66 is displayed within the configuration pane 36 of browser window 32. The path analysis function can be used to track the path the user used to browse to the web object as well as the path the used to browse from the web object. In this way, the web site operator can track which web sites the visitor is using to link to the web page in question, or which web pages the visitor browses to after browsing to the web object. Clicking on an icon within the path analysis subwindow 66 causes the configuration program to pop-up a New Path Analysis window allowing the user to specify a path name (in space 68), a number of levels from the web object in drop-down box 70, and a number of levels to the web object in drop-down box 72. In the numbers shown in FIG. 6, the user has elected to not track how the user got to the web page but does track the next five pages that the user visits. In the fully configured page shown in FIG. 9, the path analysis used is called "Reporting Center Product Page."

An example of path analysis is in tracking "steps of interest", which tracks whether people reach the end of the browsing process. In an eCommerce example of steps of interest, the path analysis could determine whether purchasers at an eCommerce web site drop out between the process of selecting items for purchase on the site by loading a virtual shopping cart and the process of actually confirming the order along with credit card information. As there may be several steps between the shopping cart and the order confirmation pages, path analysis of visitor behavior will allow the web site owner to gauge the success of its web site to hold the interest of the prospective purchaser and close the deal.

Figure 5:
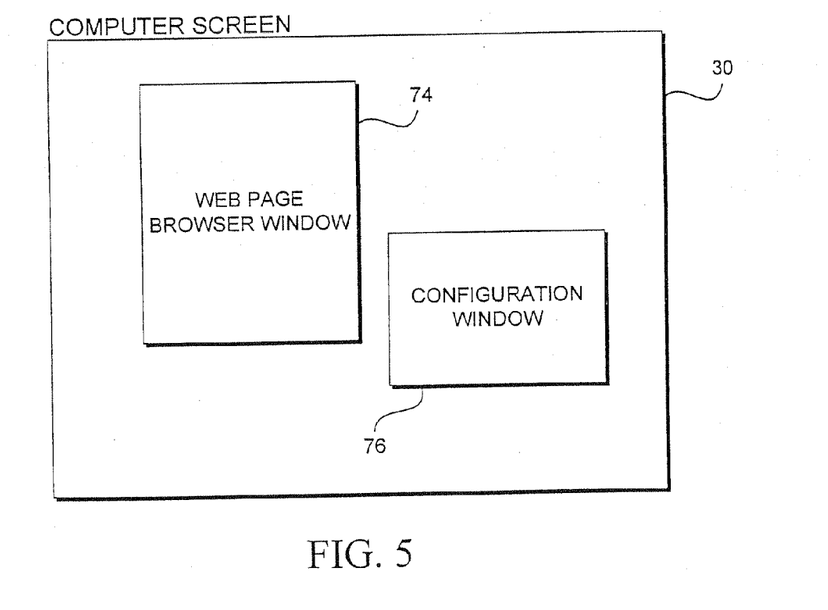
FIG. 5 is a block diagram of multiple windows within a graphics display showing the graphic interface used to configure a software program according to an alternate embodiment of the invention.

FIG. 5 illustrates a second method for implementing the invention whereby the web page preview pane and configuration pane exist separately as a web page browser window 74 and a configuration window 76 on computer screen 30. As with the first embodiment shown in FIGS. 3 and 9, the web object to be tracked is displayed at the same time as the tracking criteria.

The major benefit of this invention is that the process of configuration is much less prone to error because (1) the user selects pages of interest by navigating the website of interest in its natural fashion through a browser rather than by remembering URLs, which can be cryptic, and (2) the user has direct, immediate feedback as to the effect of his/her actions so that when a configuration is changed, the result is shown immediately and in context.

The tracking criteria are stored in data analysis server 22 (FIG. 1). Upon operation of the configuration program to specify the tracking criteria associated with a particular web site, the web tracking criteria stored on the data analysis server 22 are downloaded by the configuration computer 16. Once the configured tracking criterion is automatically associated with the web object and respective web object link, as by using the code shown in APPENDIX, the configured tracking criteria is uploaded from storage on the tracking server 22.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for configuring a web site traffic tracking program on a computer coupled over a network to a web server, comprising:
   operating on a computer a web browser software program and a configuration program to browse over a network to a first web object to be tracked, said first web object to be tracked stored on a web server and having an associated first web object link;
   displaying on a display device coupled to the computer a web page browser window associated with the web browser software program;
   dividing the web page browser window into a web page preview pane and a configuration pane;
   displaying the first web object to be tracked within the web page preview pane; and
   responsive to the configuration program, displaying web object tracking criteria for the first web object to be tracked within the configuration pane.

2. The method of claim 1, further including:
   browsing over the network to a second web object to be tracked;
   displaying the second web object to be tracked within the web page preview pane in place of the first web object to be tracked; and
   displaying web object tracking criteria for the second web object to be tracked within the configuration pane.

3. The method of claim 1, further including:
   selecting within the configuration pane the web tracking criterion to be configured;
   configuring the web tracking criterion selected; and
   displaying the newly configured web tracking criterion within the browser window simultaneously with the web object with which the criterion is associated.

4. The method of claim 3 wherein the first web object to be tracked is a web page and the first web object link is a URL, the method further including the steps of:
   automatically associating the URL of the first web object displayed within the browser window with the configured tracking criterion; and
   generating a regular expression responsive to the configuring step and to the first web object URL.

5. The method of claim 3, wherein the criterion is a web page tracking group, the method further comprising:
   selecting a selected tracking group from a global list of tracking groups and, upon selection, automatically associating the selected tracking group with the displayed first web object to be tracked; and
   displaying the selected tracking group associated with the displayed first web object to be tracked within the configuration pane.

6. The method of claim 5, wherein simultaneous with the step of automatically associating the selected tracking group with the displayed first web object to be tracked, automatically associating a second web object to be tracked, said second web object having an identical directory level.

7. The method of claim 3, wherein the criterion is a web page tracking group, the method further comprising:

creating a new tracking group and, upon creation, automatically associating the new tracking group with the displayed first web object to be tracked; and displaying the new tracking group associated with the displayed first web object to be tracked within the configuration pane.

8. The method of claim 7, wherein simultaneous with the step of automatically associating the new tracking group with the displayed first web object to be tracked, automatically associating a second web object to be tracked, said second web object having an identical directory level.

9. The method of claim 4, wherein the criterion is a path analysis, the method further comprising receiving from the computer operator an input specifying a number of levels to track from the displayed first web object to be tracked.

10. The method of claim 4, wherein the criterion is a path analysis, the method further comprising receiving from the computer operator an input specifying a number of levels to track to the displayed first web object to be tracked.

11. The method of claim 1 wherein the first web object to be tracked is a web page and the first web object link is a URL.

12. A method for configuring a web site traffic tracking program on a computer coupled over a network to a web server, comprising:

operating on a computer a web browser software program and a configuration program to browse over a network to a first web object to be tracked, said first web object to be tracked being stored on a web server and having an associated first web object link;

displaying on a display device coupled to the computer a web page browser window associated with the web browser software program and a configuration subwindow;

displaying the first web object to be tracked within the web page browser window;

responsive to the configuration program, displaying web object tracking criteria for the first web object to be tracked within the configuration subwindow;

selecting within the configuration subwindow the web tracking criterion to be configured;

configuring the web tracking criterion selected; and automatically associating the web object link of the first web page displayed within the browser window with the configured tracking criterion.

13. The method of claim 12 wherein the first web object to be tracked is a web page and the first web object link is a URL.

14. The method of claim 12, wherein the configuration subwindow comprises a pane of the browser window.

15. The method of claim 12, wherein the configuration subwindow comprises a popup window separate from the browser window.

16. The method of claim 12, further comprising:

downloading over the network from a tracking server to the computer the web tracking criteria; and once the configured tracking criterion is automatically associated with the web object link of the first web object displayed within the browser window, uploading the configured tracking criterion for storage on the tracking server.

17. A method for arranging a plurality of web pages into tracking groups comprising:

displaying a first of the plurality of web pages within a browser window in synchronicity with displaying a configuration subwindow on a display device, said configuration window including a list of tracking groups associated with the displayed first of the plurality of web pages;

either selecting a tracking group from a global list of tracking groups or creating a new tracking group and, upon selection or creation, automatically associating the selected or new tracking group with the displayed first of the plurality of web pages;

displaying the selected or new tracking group associated with the displayed first of the plurality of web pages within the configuration window; and repeating the above steps for each of the plurality of web pages.

18. The method of claim 17, wherein simultaneous with the step of automatically associating the selected or new tracking group with the displayed first of the plurality of web pages, automatically associating a second of the plurality of web pages, said second web page having an identical directory level.

* * * * *